Aug. 7, 1962    R. G. HAASE    3,048,457
AUTOMOBILE TRAY DEVICE
Filed July 14, 1961
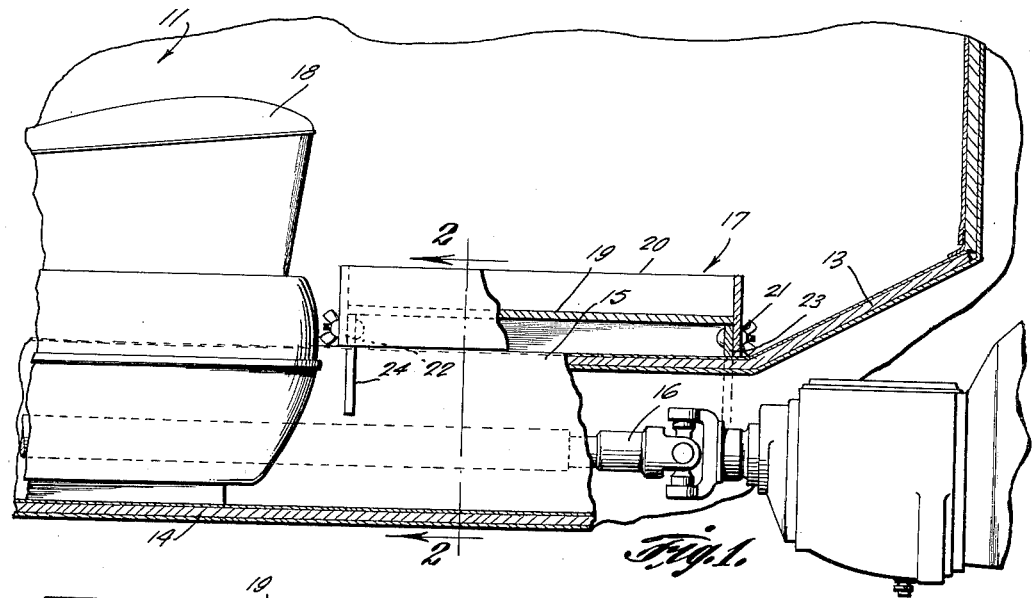
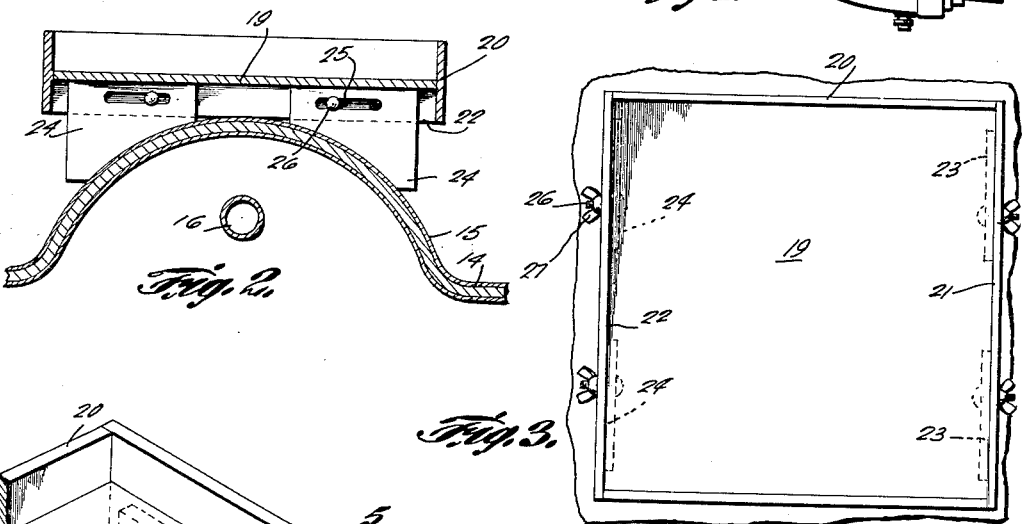
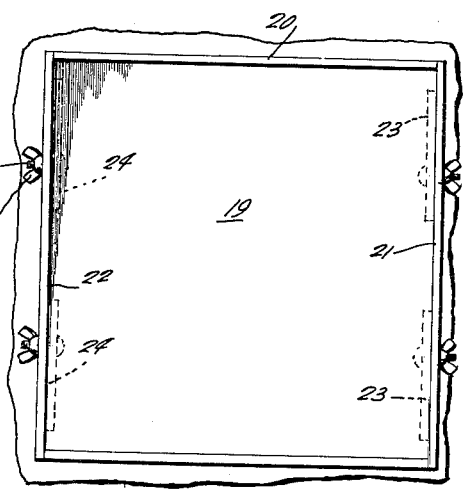
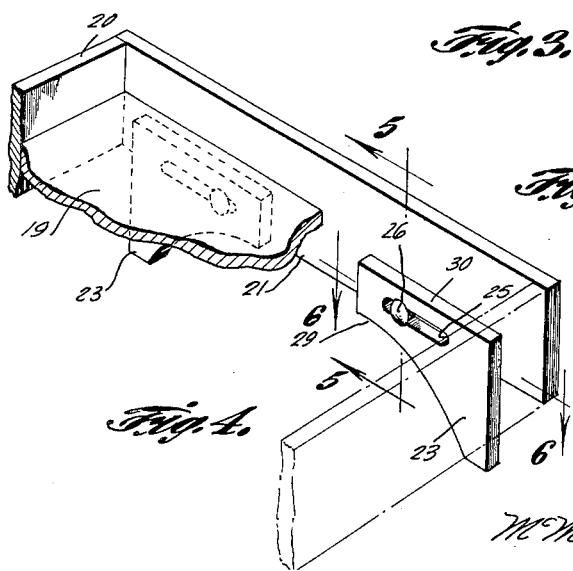
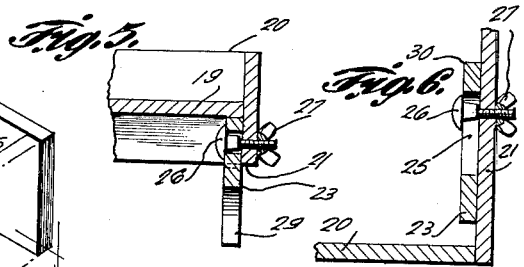
INVENTOR.
RUDOLF G. HAASE
BY
McMorrow, Berman & Davidson

United States Patent Office 3,048,457
Patented Aug. 7, 1962

3,048,457
AUTOMOBILE TRAY DEVICE
Rudolf G. Haase, 576 Plymouth Road, Hillside, N.J.
Filed July 14, 1961, Ser. No. 124,180
3 Claims. (Cl. 311—21)

This invention relates to automobile accessories, and more particularly to an article supporting tray device adapted to be mounted on the hump of an automobile floor above the automobile drive shaft.

A main object of the invention is to provide a novel and improved supporting tray adapted to be mounted on the hump portion of an automobile floor above the automobile drive shaft, the tray device being simple in construction, being relatively compact in size, and being easily adjustable so as to snugly fit on the floor hump of a wide range of different makes of automobiles.

A further object of the invention is to provide an improved automobile tray device adapted to be mounted on the floor hump of an automobile floor above the automobile drive shaft, the tray device being inexpensive to fabricate, being durable in construction, being attractive in appearance, and being adjustable so that it will closely fit the contour of the floor hump and will thus be securely supported on the floor hump without the risk of shaking loose or sliding off.

Further objects and advantages of the invention will become apparent from the following description and claims, and from the accompanying drawings, wherein:

FIGURE 1 is a fragmentary longitudinal vertical cross sectional view taken through the central portion of the passenger compartment of an automobile showing an improved tray device, according to the present invention, mounted on the hump portion of the automobile floor in operative position.

FIGURE 2 is a transverse vertical cross sectional view taken substantially on the line 2—2 of FIGURE 1.

FIGURE 3 is a top plan view of the tray device, as employed in FIGURES 1 and 2.

FIGURE 4 is a fragmentary perspective view of a portion of the tray device of FIGURES 1 to 3, illustrating the manner in which the support members thereof are adjustably secured.

FIGURE 5 is a cross sectional detail view taken substantially on the line 5—5 of FIGURE 4.

FIGURE 6 is a cross sectional view taken substantially on the line 6—6 of FIGURE 4.

Referring to the drawings, 11 generally designates the passenger compartment of a conventional automobile, the automobile body being provided with the vertical fire wall 12, the inclined floor board portion 13, and the horizontal main floor portion 14. The floor is formed with the longitudinally extending usual floor hump 15 which overlies the longitudinally extending drive shaft 16 of the automobile, as shown in FIGURE 1.

Designated generally at 17 is an improved article supporting tray device according to the present invention which is arranged to be mounted on the floor hump forwardly adjacent the mid portion of the front seat 18 of the automobile. The tray device 17 comprises a horizontal tray member comprising a generally rectangular flat bottom wall 19 and peripheral walls 20 secured to the edges of and surrounding the flat bottom wall 19. The edges of the bottom wall 19 are secured to the intermediate portions of the peripheral walls 20 so that said peripheral walls depend a substantial distance below the bottom wall 19. Adjustably secured to the front and rear depending peripheral wall portions, shown respectively at 21 and 22, are respective pairs of opposed depending support members 23, 23 and 24, 24.

The support members 23 and 24 are provided with horizontal slots 25 through which extend bolt members 26 engaged through apertures provided in the depending front and rear wall portions 21 and 22, the head portions of the bolts being located at the inner sides of the support members and the shank portions of the bolts extending through the slots 25 and projecting outwardly of the depending front and rear peripheral wall portions 21 and 22. Wing nuts 27 are provided on the externally projecting ends of the bolts, said wing nuts providing a means for rigidly clamping the support members 23 and 24 in adjusted positions on the depending front and rear wall portions 21 and 22.

The bottom edges of the support members 23 and 24 are arcuately curved, as shown at 29, so as to conformably fit on the floor hump 15 of the automobile, the top edges of the support members being horizontal and straight, as shown at 30, and being slidably engageable with the horizontal bottom wall 19 of the tray member. Thus, the support members 23 and 24 are slidably but non-rotatably engaged with the tray portion of the device so as to permit sliding adjustment horizontally of said support members when the wing nuts 27 are loosened.

In installing the tray device, the wing nuts 27 are loosened and the support members 23, 23 and 24, 24 are slidably adjusted until their arcuately curved bottom edge portions 29 snugly fit on the floor hump 15 on which the tray device is to be employed. When the support members have been adjusted to make a snug and tight fit with the floor hump 15, the wing nuts 27 are tightened, whereby the support members 23, 23 and 24, 24 are locked to the depending front and rear peripheral wall portions 21 and 22. With the contoured edge portions 29 in close interfitting engagement with the floor hump 15, the tray device is securely supported and will not slide, tilt or shake loose from the floor hump.

Obviously, if the device is to be employed in a different automobile, it may be easily adjusted so that its depending support members 24, 24 and 23, 23 closely and snugly fit on the floor hump of the vehicle to which it is to be transferred.

As shown in FIGURE 1, the tray device provides a convenient receptacle in which to place various items, such as cigarettes, sunglasses, maps, or other articles, thus supporting the articles within convenient reach of the vehicle operator or of the other passengers using the front seat of the automobile.

While a specific embodiment of an improved automobile tray device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. An automobile tray device comprising a horizontal tray member comprising a flat bottom wall and peripheral walls surrounding same, the front and rear portions of the peripheral walls dependings below said flat bottom wall, and respective pairs of opposed depending flat, plate-like support members adjustably secured to the inside of said front and rear portions and having bottom edges contoured to conformably engage transversely on the hump of an automobile floor above the automobile drive shaft and top edges abutting said flat bottom wall to prevent rotation of said support members.

2. An automobile tray device comprising a horizontal tray member comprising a flat bottom wall and peripheral walls surrounding same, the front and rear portions of the peripheral walls depending below said flat bottom wall, and respective pairs of opposed depending flat, plate-like support members adjustably secured to said front and rear portions and having bottom edges contoured to conformably engage transversely on the hump of an automobile floor above the automobile drive shaft, said support members being disposed inside said front and rear portions and having horizontal top edges slidably engaging said flat bottom wall whereby to prevent rotation of the support members.

3. An automobile tray device comprising a horizontal tray member comprising a flat bottom wall and peripheral walls surrounding same, the front and rear portions of the peripheral walls depending below said flat bottom wall, and respective pairs of opposed horizontally slotted depending flat, plate-like support members adjustably secured at the horizontal slots thereof to said front and rear portions and having bottom edges contoured to conformably engage transversely on the hump of an automobile floor above the automobile drive shaft, said support members being slidably engaged with the inside surfaces of said front and rear portions and having horizontal top edges slidably engaging said flat bottom wall, whereby to prevent rotation of the support members.

References Cited in the file of this patent
UNITED STATES PATENTS

| | | |
|---|---|---|
| 2,647,716 | Hudziak et al. | Aug. 4, 1953 |
| 2,670,260 | Watt | Feb. 23, 1954 |
| 2,797,973 | Culpepper | July 2, 1957 |
| 2,825,611 | Aynesworth | Mar. 4, 1958 |
| 2,837,388 | Majeruni et al. | June 3, 1958 |
| 2,844,429 | Frey | July 22, 1958 |
| 2,969,900 | Heuler | Jan. 31, 1961 |
| 2,968,438 | Smathers et al. | May 30, 1961 |